US010750000B1

(12) United States Patent
Adams

(10) Patent No.: US 10,750,000 B1
(45) Date of Patent: Aug. 18, 2020

(54) OPPORTUNISTIC INITIATION OF VOICE OR VIDEO CALLS BETWEEN SMART SPEAKER DEVICES

(71) Applicant: BlackBerry Limited, Wateloo (CA)

(72) Inventor: Neil Patrick Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/259,266

(22) Filed: Jan. 28, 2019

(51) Int. Cl.
H04M 1/247 (2006.01)
H04M 1/253 (2006.01)
G10L 15/30 (2013.01)
H04M 1/27 (2006.01)

(52) U.S. Cl.
CPC ........... *H04M 1/2473* (2013.01); *G10L 15/30* (2013.01); *H04M 1/2535* (2013.01); *H04M 1/271* (2013.01)

(58) Field of Classification Search
CPC .. H04M 1/2473; H04M 1/2535; H04M 1/271; H04M 3/424; H04M 3/487; G10L 15/30; G10L 15/26; G10L 17/00
USPC ............ 379/88.01, 88.03, 420.01; 455/414.1
See application file for complete search history.

(56) References Cited

U.S. PATENT DOCUMENTS

| 7,319,861 | B2 * | 1/2008 | Benco | H04M 3/424 379/352 |
| 8,208,609 | B2 * | 6/2012 | Harris | H04M 1/271 379/205.01 |
| 10,306,000 | B1 * | 5/2019 | Isacks | H04L 65/1069 |
| 2003/0112948 | A1 | 6/2003 | Brown et al. | |
| 2004/0002329 | A1 * | 1/2004 | Bhatia | H04M 3/42374 455/422.1 |
| 2004/0114744 | A1 | 6/2004 | Trossen | |
| 2004/0176100 | A1 * | 9/2004 | Florkey | H04W 76/40 455/456.1 |
| 2005/0260975 | A1 | 11/2005 | Chen et al. | |
| 2008/0076395 | A1 * | 3/2008 | Bhatia | H04M 3/42365 455/413 |

(Continued)

FOREIGN PATENT DOCUMENTS

CN 104506991 B 12/2017

OTHER PUBLICATIONS

Anonymous, "Speaker identification based on user context". An Ip.com Prior Art Database Technical Disclosure, IP.com No. IPCOM000251846D, published Dec. 6, 2017, 7 pgs.

(Continued)

*Primary Examiner* — Binh Kien Tieu
(74) *Attorney, Agent, or Firm* — Jenna L. Wilson; Wilson Lue LLP

(57) ABSTRACT

A method and system are provided for opportunistically initiating a multimedia call between two or more devices such as smart speakers at a time when users of the respective smart speakers are available to participate in a call. A server system receives an instruction from a first smart speaker associated with a first user to establish a real-time communication session with a second smart speaker. In response to that instruction, the server system monitors availability of both the first user and the second user at their respective smart speakers. On determining that both the first user and the second user are available at the same time, the server system initiates the real-time communication session between the first smart speaker and the second smart speaker.

18 Claims, 7 Drawing Sheets

(56) References Cited

U.S. PATENT DOCUMENTS

| | | | | | |
|---|---|---|---|---|---|
| 2008/0112567 | A1* | 5/2008 | Siegel | ................ | H04R 1/10 |
| | | | | | 381/58 |
| 2008/0140415 | A1* | 6/2008 | Shostak | ................ | G10L 15/26 |
| | | | | | 704/270.1 |
| 2008/0253549 | A1* | 10/2008 | Loveland | ................ | H04L 29/06 |
| | | | | | 379/202.01 |
| 2013/0225210 | A1* | 8/2013 | Rosener | ................ | H04W 4/12 |
| | | | | | 455/458 |
| 2014/0237123 | A1* | 8/2014 | Dave | ................ | H04M 3/42 |
| | | | | | 709/227 |
| 2018/0152665 | A1* | 5/2018 | Zuo | ................ | H04N 7/147 |
| 2019/0215346 | A1* | 7/2019 | Seyvet | ................ | H04L 65/1076 |

OTHER PUBLICATIONS

Anonymous, "Systems and Methods for Identifying a Speaker and/or their Attention with Cameras and/or Microphones". An Ip.com Prior Art Database Technical Disclosure, IP.com No. IPCOM000253632D, published Apr. 18, 2018, 11 pgs.

Anonymous, "IoT Control Device with Simplified Interface". An Ip.com Prior Art Database Technical Disclosure, IP.com No. IPCOM000255196D, published Sep. 10, 2018, 23 pgs.

Anonymous, "Voice interface responses based on prior user interactions". An Ip.com Prior Art Database Technical Disclosure, IP.com No. IPCOM000257361D, published Feb. 5, 2019, 7 pgs.

Amazon.com, Inc., "Manage Calendar Events with Alexa". Retrieved from the Internet: URL:https://www.amazon.com/gp/help/customer/display.html?nodeId=202127000, published as early as Oct. 16, 2018, 2 pgs.

Amazon.com, Inc., "Glympse". Retrieved from the Internet: URL: https://support.google.com/googlehome/answer/7531913?hl=en&co=GENIE.Platform=Android, published at least as early as Oct. 16, 2018, 5 pgs.

Google Home, "Broadcast voice messages to Google Home devices". Retrieved from the Internet: URL: https://www.amazon.com/Glympse/dp/B019X6M400, published at least as early as Oct. 2, 2018, 4 pgs.

Whitney, Lance, PCMag.com, "How to Call Someone From Your Amazon Echo". Retrieved from the Internet: URL: https://www.pcmag.com/feature/358674/how-to-call-someone-from-your-amazon-echo/8 [retrieved Oct. 16, 2018] published Jan. 24, 2018, 13 pgs.

Google Home, post by u/bogus83, May 2018, "How to: Tasker and AutoCast for Google Home (Broadcasting example)". Retrieved from the Internet: URL: https://www.reddit.com/r/googlehome/comments/8glhp8/how_to_tasker_and_autocast_for_google_home/ [retrieved Oct. 2, 2018], 5 pgs.

Google Home, post by u/bogus83, May 2018, "How to: Use Google Home to activate Tasker via IFTTT". Retrieved from the Internet: URL: https://www.reddit.com/r/googlehome/comments/8g1gdl/how_to_use_google_home_to_activate_tasker_via/ [retrieved Oct. 2, 2018], 9 pgs.

* cited by examiner

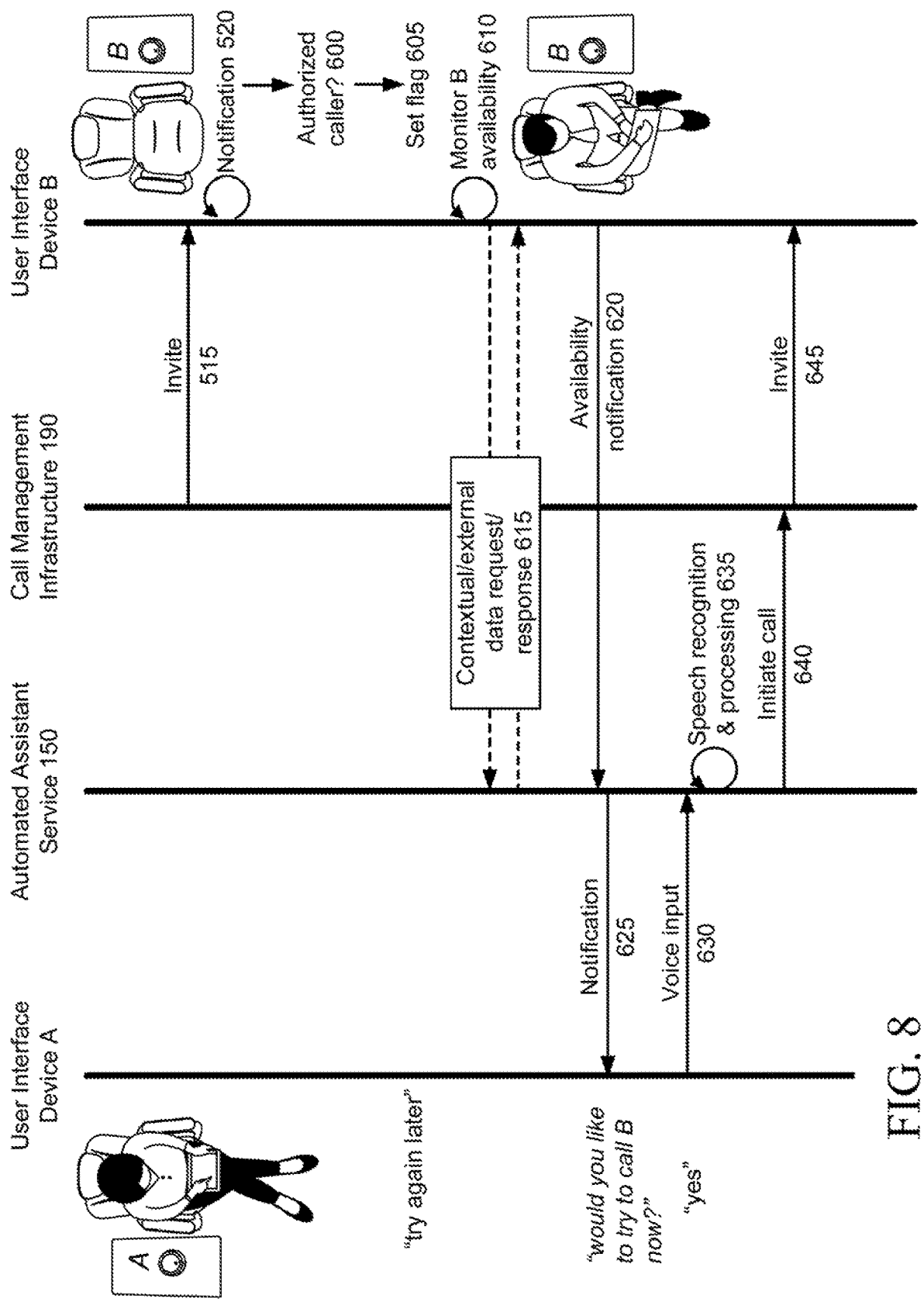

OPPORTUNISTIC INITIATION OF VOICE OR VIDEO CALLS BETWEEN SMART SPEAKER DEVICES

TECHNICAL FIELD

The present disclosure relates to user interface devices typically used in conjunction with intelligent automated assistants, and specifically to the placement of calls between parties using smart speaker devices.

TECHNICAL BACKGROUND

Smart speakers and similar devices permit users in different locations to speak to each other remotely, using voice only, or video, while also providing a convenient user interface device to an intelligent automated assistant service that can process speech input and carry out simple or sophisticated tasks in response. However, when a user places a call via a smart speaker to a user who is not currently available to take the call, the caller faces the same options as a caller using conventional telephone technology. A caller may either re-attempt the call until the user answers, or else resort to a message sent by a different protocol in order to solicit a call back or to schedule a mutually agreeable time to speak. Either option consumes excess time and network resources.

BRIEF DESCRIPTION OF THE DRAWINGS

FIGS. 7 and 8 are interaction diagrams of variants of processes of opportunistically initiating a call between smart speaker devices.

DETAILED DESCRIPTION OF EXAMPLE EMBODIMENTS

Figure 1:
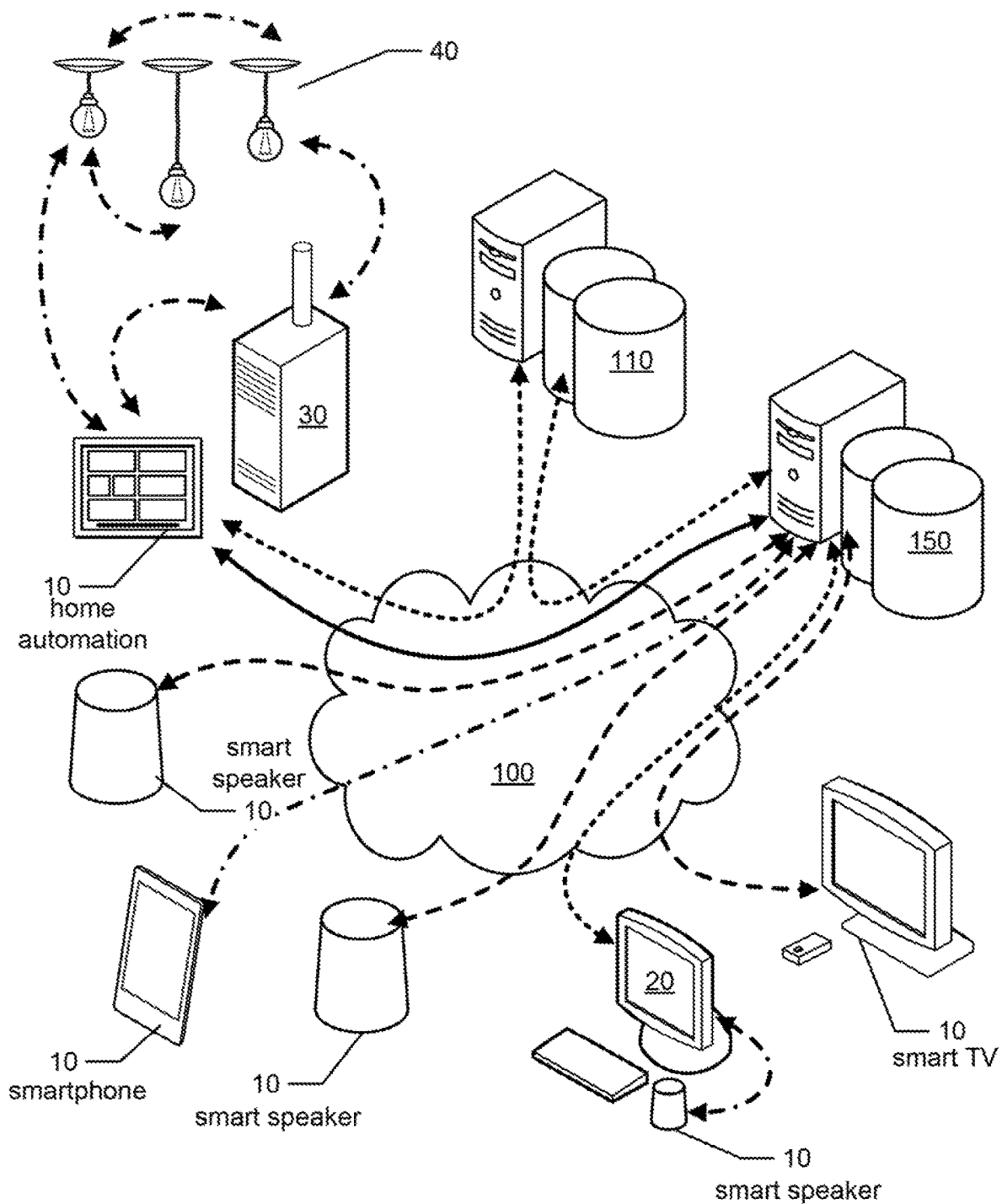
FIG. 1 is a schematic illustrating a possible network topology including a variety of smart devices and supporting systems communicating a network, such as a wide area network.

Voice-assisted intelligent automated assistants provide a convenient interface between users and a variety of services and smart devices, ranging from entertainment and productivity services and personal information management to thermostats and toys. Briefly, a voice-assisted intelligent automated assistant service receives speech input from a user and processes the input to determine the user's intent, and execute tasks in compliance with the determined intent, either directly or by transmitting instructions or data to other services or devices. For example, a voice-assisted intelligent automated assistant service executing on a user's smartphone may receive a spoken command from the user—"call Alice"—identify an intent to place a voice call to a person listed in the user's address book, and automatically initiate a voice call to that person. A voice-assisted intelligent automated assistant service operating in a home automation network may receive a spoken command from the user to configure a room for movie viewing, identify an intent to decrease room lighting to a specified level and to close the window blinds, and automatically transmit instructions to respective controllers to accomplish those tasks. The assistant may also handle personal data management or queries—for example, a user may instruct the assistant, "remind me to mail that letter tomorrow" or ask, "what is the current temperature?". The assistant, in the first case, may identify the user's intent to set a reminder in a calendar data store, and will create and save the event. In the second case, the assistant will infer that the user seeks an informational answer and provide an audible answer with the requested information.

Typically, a voice-assisted intelligent automated assistant service relies on speech recognition and natural language processing in order to successfully discern the user's intent and to identify appropriate workflows and tasks that are likely to fulfil the user's intent. For example, for a service to answer the question "what is the current temperature?", the service may convert the user's speech to text, and perform natural language processing on the text to determine that the user's request is directed to a weather report. The service then determines any contextual information, such as the user's current geographic location, that must be collected, then a suitable query is constructed and transmitted to an appropriate information service. The response from the information service, likely received in a text format, may then be converted from text to speech and delivered to the user. Artificial intelligence may be employed to enhance any part of the intelligent automated assistant service, such as speech recognition, language process, or workflow development. Since voice-assisted technology of this nature may be included in many forms of smart devices in the home and workplace, it is generally considered practical and cost-effective for the resource-intensive processes of speech recognition and language processing to be hosted remotely from the user and the local user interface device providing the user with access to the intelligent automated assistant service. Thus voice-assisted intelligent automated assistants are commonly implemented for most users in a platform as a service (PaaS) or software as a service (SaaS) model. Organizations capable of operating and maintaining their own infrastructure may implement an assistant service in a self-hosted model. Examples of currently commercialized intelligent automated assistant services include Amazon Alexa® from Amazon.com, Inc.; Google Assistant™ from Google LLC; and Cortana® from Microsoft Corporation. These platforms are offered as cloud-based services to users, who may access the service using any compatible user interface device.

An increasingly common user interface device for accessing these services is the so-called "smart speaker" device, which in its most common household or workplace form is a portable or mountable electronic device including a built-in speaker, microphone array, and network communication subsystem that is configured to receive speech input and interface with an intelligent automated assistant system to provide assistant services. While a form of virtual assistant or software agent may execute on the device itself, as discussed above smart speaker solutions often rely on a cloud-based service, thereby reducing the power consumption and processing requirements of the smart speaker. Such conventional smart speakers may not be intended to be mobile devices—typically, they are tabletop devices or wall or ceiling-mounted devices—they may be considered mobile or portable in the sense that they are easily repositioned with little effort on the part of the user.

FIG. 1 illustrates an example topology including user interface devices 10. In this example, the various user interface devices 10 communicate over a network with a central intelligent automated assistant service provided by a remote system 150. The term "central" is used to denote a single system 150 that may serve a variety of devices in households, workplaces, domains, and organizations over a wide area network 100, typically the Internet; the system 150 may be implemented using a cloud-type architecture in which computing and storage resources are distributed over the same network 100 or across another network, not shown. As described above, central system 150 may execute speech recognition and language processing routines on data received from each of the user interface devices 10. The system 150 may provide other data processing services as mentioned above to enable the identification and execution of workflows to fulfill tasks on behalf of the users of the user interface devices 10. The system 150 may comprise one or more server systems and data stores, utilizing at least one processor, appropriate communication subsystems, and memory devices; the appropriate configuration of such systems will be understood by those skilled in the art.

The user interface devices 10 in the network can include smart speakers, smartphones and other wireless communication devices, home automation control systems, smart televisions and other entertainment devices, and the like. User interface devices 10 may be provided in any suitable environment; for example, while not shown in FIG. 1, a user interface device may be provided in a motor vehicle. The user interface devices 10 may operate in a standalone manner, not part of a local area network or mesh network; or they may operate in a local network. For example, FIG. 1 illustrates a smart speaker wirelessly paired (e.g., using the Bluetooth® protocol) with a personal computer 20. Alternatively, the personal computer 20 may be used to control the smart speaker. A smart speaker may also be paired with or controlled by a mobile wireless communication device, as discussed below. A user interface device 10 that operates as a home automation control system may be joined in a mesh network with one or more smart appliances, such as light fixtures 30, or a heating or cooling system 40. Each of these user interface devices 10 may provide a voice interface (e.g., a microphone array, speaker or audio line out, and associated signal processing components) for a local user to interact with the intelligent automated assistant service provided by the system 150 as described above.

Some user interface devices 10 may be configured to communicate with other services over the network 100, such as a home automation or security service 110. The central intelligent automated assistant system 150 may be configured to communicate with the additional service 110 to execute tasks as required for a user; for instance, a mobile user who is away from home may instruct the intelligent automated assistant service via her smartphone, which operates as a user interface device 10 for the intelligent automated assistant service, to verify that the front door of her home is locked; the speech input is transmitted from the smartphone to the service 150, which recognizes and processes the speech input to define an instruction for the security service 110, and transmits an instruction to the security service 110. The security service 110 then transmits its own instruction to the smart lock on the user's door. Configuration of these devices and systems to accomplish such tasks, for example through the use of application programming interfaces and appropriate authentication protocols, will be known to those skilled in the art. Further, a user interface device 10 may be configured to communicate with a plurality of intelligent automated assistant systems, and not merely the single system 150 illustrated in FIG. 1.

Figure 2:
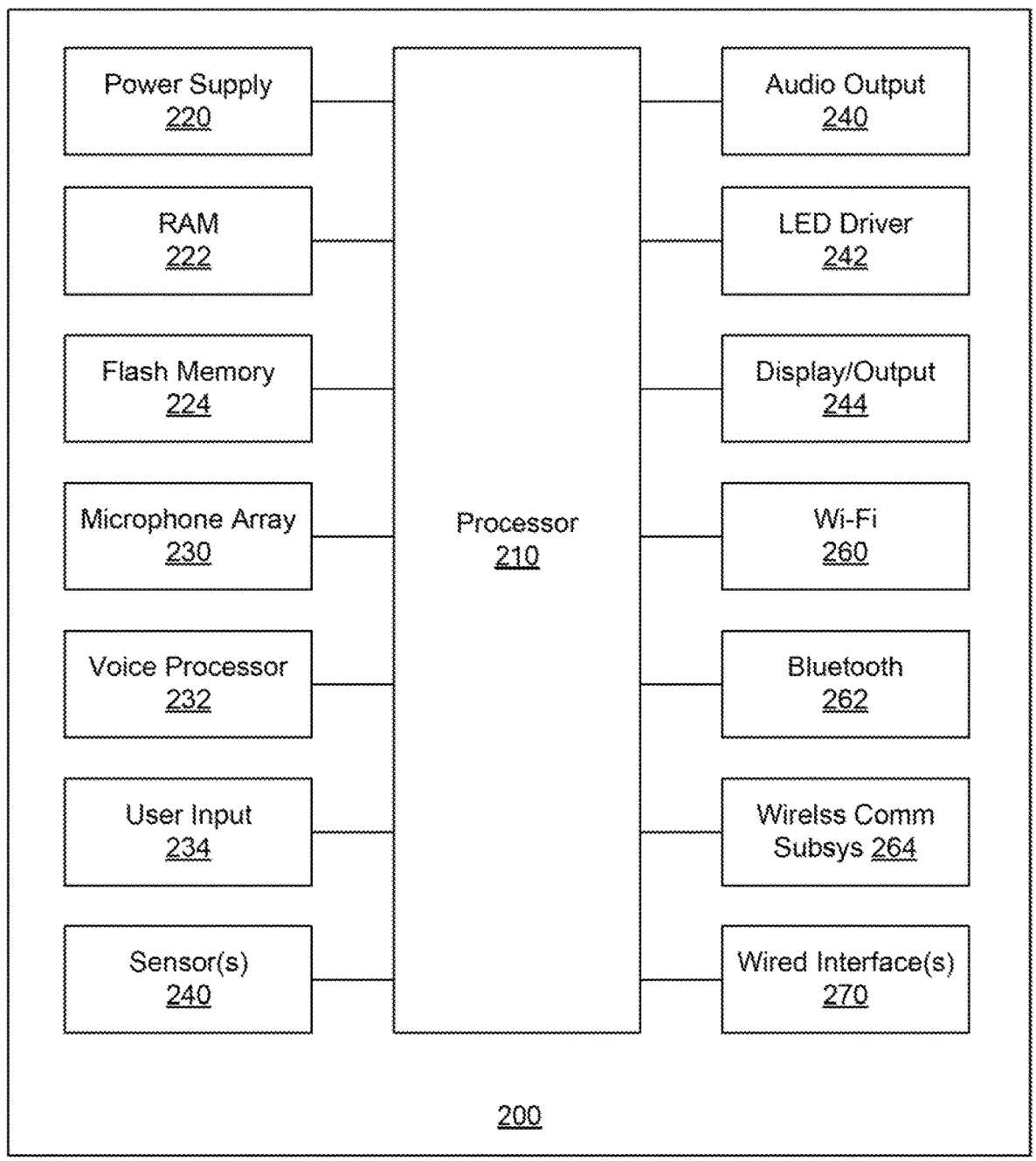
FIG. 2 is a block diagram illustrating select components of a user interface device such as a smart speaker.

FIG. 2 illustrates select components of a smart speaker device 200. The device includes a microprocessor 210 for executing the device operating system and locally stored programming. Volatile memory, such as random access memory 222, and non-volatile memory, such as flash memory 224, store code and data, including recorded audio data. Audio data obtained by the smart speaker 220 may be stored permanently or temporarily in memory in the smart speaker 200, whether it is transmitted to a remote system for recognition and processing or not. For example, audio data may be stored in an internal buffer in memory prior to sending to a communications subsystem of the speaker 200. The memory 222 and/or 224 and the microprocessor 210 may be provided in an integrated system on chip (SoC), separately from or together with at least some of the communication subsystems described below.

Audio input is received by the smart speaker device 200 by an audio input subsystem, which in this example comprises a microphone array 230 and processing elements 232. The microphone array 230 may comprise one or more microphones, preferably a plurality of microphones, and may be comprised in a SoC including far-field voice processing and other digital signal processing components 232. In some embodiments, as referenced below, the SoC may include circuitry or programming to enable detection of a "wake word", i.e., a trigger word or sound that is used to trigger audio recording and transmission of audio from the smart speaker 200 to a remote system such as the system 150. In other embodiments, wake word detection functionality may be implemented by the microprocessor 210.

In addition to the audio input subsystem, other user input mechanisms 234 may be provided, including, but not limited to, push buttons, sliders, rocker switches, dials, and touch interfaces such as capacitive buttons or touchscreens, and associated processing components. These user input mechanisms 234 can be operated to power the smart speaker 200 on and off; to mute the microphone array 230; to adjust the volume of the output audio from the smart speaker 200; and, as discussed below, to enter a privacy mode. The smart speaker 200 may receive other input through sensors 240, including, but not limited to, cameras, ambient light sensors, gyroscopes, temperature sensors, and humidity sensors. This other input may be used to provide context to user commands when input speech is processed by the smart speaker 200 or the remote system 150.

User feedback can be provided by the smart speaker device 200 using an audio output subsystem 240. This can include a speaker assembly and one or more lines out for connecting an external speaker device, headphones, and the like. Alternatively or additionally, visual and/or haptic, or other sensory feedback can be provided by appropriate output means 244. For instance, an LED driver 242 and an LED array or display may be provided to indicate when the smart speaker 200 is in a powered on state, a mute mode, or a privacy mode as discussed below.

The smart speaker device 200 can be provided with one or more wired or wireless communications subsystems 260, 262, 264, 270. In some implementations, the smart speaker 200 may be provided with a cellular transceiver for communicating with one or more radio access networks, using one or more wireless data communication protocols and standards. For use in a home or office environment, however, a cellular transceiver may not be used, since the local network may be a wireless local area network (WLAN). Thus, a WLAN transceiver may be provided for communicating with the WLAN via a suitable access point, in accordance with IEEE 802.11x standards (sometimes referred to as Wi-Fi®). Other communication protocols may be used for the WLAN. The wireless transceivers may also comprise a short-range wireless transceiver, such as a Bluetooth® transceiver 262, for communicating with a nearby device. The Bluetooth transceiver 262 may be compatible with any suitable version of the Bluetooth protocol including Bluetooth low energy (Bluetooth Smart). Other short-range wireless communication technologies may be provided instead of, or in addition to, Bluetooth including but not limited to Near Field Communication (NFC), IEEE 802.15.3a (also referred to as UltraWideband (UWB)), Z-Wave, ZigBee, ANT/ANT+ or infrared (e.g., Infrared Data Association (IrDA) communication).

The mobile transceiver 200 may alternatively communicate with a LAN or other device using a wired port 270, such as an Ethernet port. Several ports may be provided, including USB-compliant ports for communication with other user devices, or for debugging or programming purposes.

The smart speaker device 200 includes a power supply, which may include energy storage (e.g., a removeable or non-removable battery). The components illustrated in FIG. 2 may be packaged in a cooperating cover and a base, or any suitable containing structure.

It will be understood by those skilled in the art that FIG. 2 and the foregoing description describes only select components of a smart speaker 200 for ease of exposition. Many components that would be known to and understood by those skilled in the art, such as controllers, rectifiers, converters, amplifiers, codecs, and the like are not shown in the interest of simplicity.

A user interface device such as the smart speaker device 200 may operate as an interface for a voice-assisted intelligent automated assistant service 150 by receiving speech input at the microphone array 230. As mentioned above, the device 200 may include a far-field voice processor and other required signal processing components 232. Speech input data generated by these components may be stored temporarily or permanently in the device 200, for example in volatile or non-volatile memory. If the smart speaker device 200 is also configured to recognize and process speech input to identify user commands and include an intelligent automated assistant module (e.g., program code executable by the processor 210 to operate as an intelligent automated assistant), then the processor 210 and associated programming would process the speech input data accordingly, and determine what, if any, responsive action to execute. However, the speech input data is often instead transmitted via a communications subsystem to a remote service, such as the intelligent automated assistant service 150, where the speech input data is processed to identify user commands and determine what responsive actions to take. For example, the smart speaker device 200 may be connected by a fixed connection (using a wired interface 270) to a local area network, which in turn directs communications between the intelligent automated assistant service 150 and the device 200 over the wide area network. The smart speaker device 200 may instead be connected to a local network by a wireless communications subsystem 264, such as a Wi-Fi communications subsystem, communicating with a local access point (not shown in FIG. 2).

In either case, the intelligent automated assistant may be configured to access additional data stores accessible to the assistant, or obtain data from other devices or services to which it has access—for example, it may be configured to receive additional data from the user's associated smartphone or home automation system—to obtain information that is used to assist in recognizing user commands or determining responsive actions. If the additional data is received by the smart speaker device 200, it may be received over a fixed or wireless connection.

A smart speaker device 200 may provide a user interface for voice, and optionally video, communication services with other parties. Communications of this type may be effected through a call management infrastructure, represented in FIG. 3 by a call management infrastructure cloud 190. This represents all services associated with the initiation and management of multimedia communications, for example over an Internet Protocol (IP) network, including but not limited to messaging gateways and service centers, streaming media servers, voice over IP (VoIP) servers, billing services, and the like, employing appropriate protocols, such as Real Time Streaming Protocol (RTSP), Real Time Transport and Control Protocols (RTP, RTCP), Session Initiation Protocol (SIP), and/or WebRTC. These services may be operated by one or more operators, who may be same as, or distinct from, the operator of the intelligent automated assistant service 150 and/or the operator of the local networks where the smart speaker devices reside.

Figure 3:
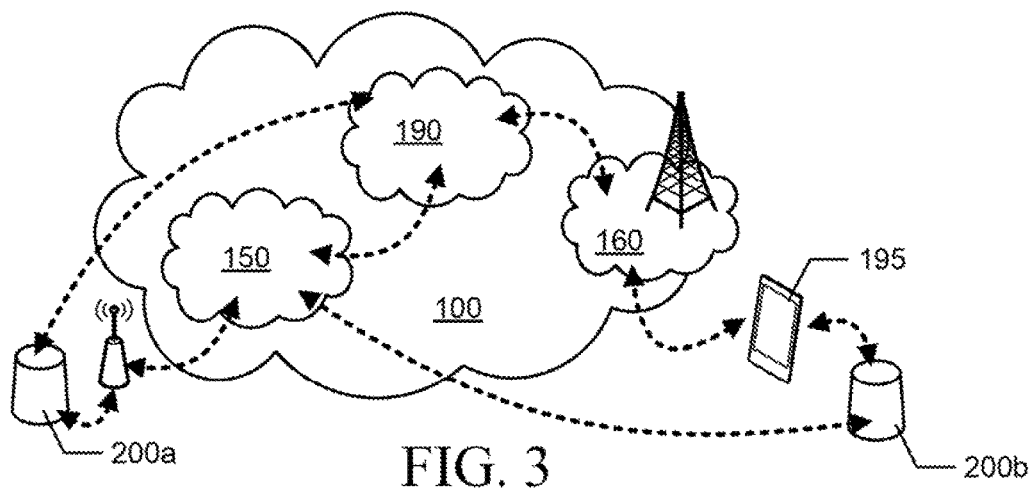
FIG. 3 is a schematic illustrating a possible communication path between two users employing user interface devices embodying a smart speaker.

FIG. 3 illustrates possible communication pathways when a call is established between two users of smart speaker devices. It should be understood by those skilled in the art that the various examples described here are intended to be illustrative only, and not limiting. Voice and/or video data from a first smart speaker device 200a for the call may be transmitted to a local network access point (as necessary), and thence over a network, such as network 100, to the call management infrastructure 190, which routes the data to a recipient smart speaker device. The recipient smart speaker device may be another smart speaker device communicating over the network 100 like 200a, in which case the call management infrastructure 190 routes the data to the recipient device over the network 100. In the meantime, other communications between the smart speaker device 200a and the intelligent automated assistant service 150, which can include voice and video (e.g., user instructions to the intelligent automated assistant service) may be routed through the same network 100.

In a typical household or workplace implementation, where individual householders employ portable smart speaker devices and do not host their own intelligent automated assistant services 150 and use a third-party call management infrastructure 190, communications between the smart speaker and the intelligent automated assistant service 150 and the smart speaker and the infrastructure 190 are both routed via the Internet. Since smart speaker functions are typically voice-activated, in a typical use case the at the first smart speaker device 200a will provide speech input to her device 200a to place a call, (e.g., "call Bob"). The call may be a real-time communication session, which is generally referred to here as a "call" or "call session". Since no call session has yet been established, the speech input will be routed to the intelligent automated assistant service 150 over the network 100, where the speech will be recognized and processed as an instruction to place a call, and the intelligent automated assistant service 150 will execute processes to identify the addressee (e.g., from the user's address book or other contact data store, to which the service 150 has access) and initiate the call to the addressee. Initiation of the call may comprise transmission of instructions to the call management infrastructure 190 to initiate the call using an established protocol, such as SIP, or transmission of instructions back to the caller's smart speaker device 200a to initiate the call with the addressee's smart speaker device. The intelligent automated assistant service 150 may not have any further role in placing or maintaining the call session, but it may monitor the status of the smart speaker devices to determine if the session is ongoing or has terminated.

It should be noted that a call may be placed from a smart speaker device 200a to another communication device, such as a mobile wireless communications device operating on a cellular network, or vice versa. In the case where a call is placed to a mobile device 195 on a cellular network 160, call data may be routed from the call management infrastructure 190 to the cellular network 160, and thence to the mobile device 195, and vice versa. Optionally, the mobile device 195 may be paired with a smart speaker 200b. The smart speaker 200b can operate as a microphone and speaker for the paired mobile device 195, thus providing hands-free operation to the user of the mobile device 195. The smart speaker 200b can still be in communication with the intelligent automated assistant service 150 via the network 100. Further, call sessions may include more than two parties; in this description, only two parties are used in these examples for the sake of simplicity. Thus, one or all users on a call may be using a smart speaker, but some number of users on the call may be using a mobile device or other communication device.

Figure 4:
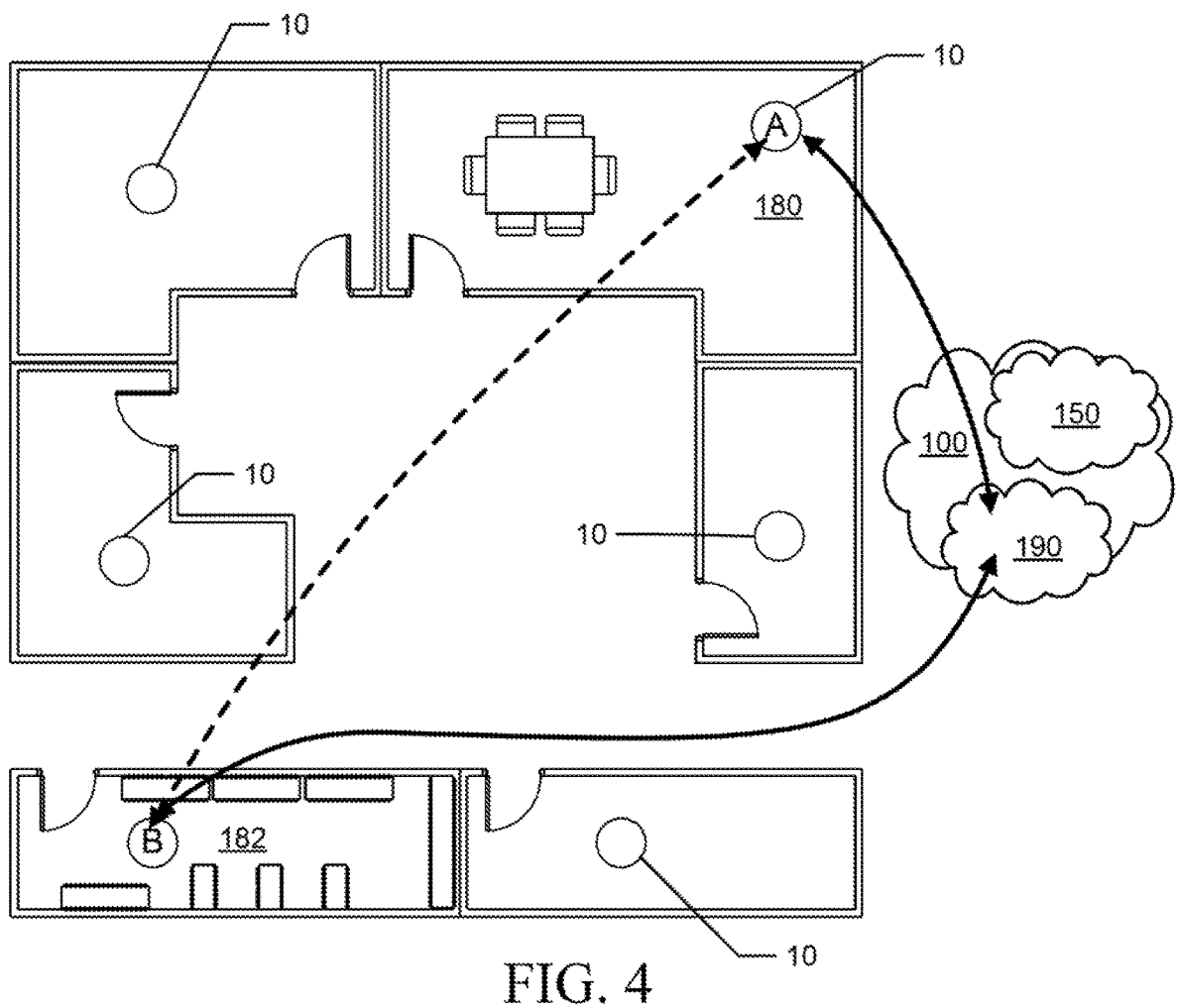
FIG. 4 is a plan view of an example scenario in which smart speaker devices may be deployed.

When a call is established between two smart speaker devices on the same network (which may be a wireless local area network), the call management infrastructure 190 may not be an external, third party infrastructure. Instead, multimedia calls may be handled by an enterprise media streaming server on the network. In some implementations, communications between two smart speaker devices may be peer-to-peer (e.g., using WebRTC) instead. These possible communication paths are illustrated schematically in FIG. 4, which depicts an example workplace with smart speaker devices 10 installed in each office or meeting room. During a call, voice or video data may be exchanged between smart speaker A and smart speaker B directly over a local network (dashed line), or via the call management infrastructure/local media streaming server 190.

When a first user at a first smart speaker device wishes to place a voice or video call to a user at a second smart speaker device, that is to say, to engage in a real-time audio or video communication session with the other user, the available options for handling an unsuccessful call are similar to the options that exist for convention telephone calls. Consider that a first smart speaker user Alice, in her office, has a question for Bob, who works in the library in a different part of the office complex, and has an associated smart speaker. Alice may provide a speech instruction to her smart speaker device A to "call Bob", or "call the library", which the intelligent automated assistant service 150 correctly interprets as an instruction to initiate a multimedia call session (voice or video) with smart speaker device B, located in the library. Bob will either respond and a call session will be established, if he is present with the smart speaker device B and he responds affirmatively when his smart speaker device B asks whether he wishes to accept the call; decline the call, if he is present and does not wish to speak; or not respond at all (e.g., if he is not even present with the smart speaker device B). Bob may already be engaged in a call session using the smart speaker device B. Thus, if no call session is established with Alice, Alice is left with the options of calling again at another time, on an ad hoc basis; leaving a multimedia message asking Bob to call her back, in an inbox for Bob to review later; or schedule a specific time to speak with Bob, for example by sending a text or multimedia message by email, short message service (SMS), or via another conventional medium, or by sending a conventional calendar invitation message, assuming that she knows his email address or mobile number.

In other words, Alice's options to connect with Bob at his smart speaker device B require either a renewed attempt to place a call when either Alice or Bob may not be available, or the use of a non-real-time messaging system to arrange a mutually agreeable time to speak. Alice may need to leave her office, and thus may be out of audio reach of her smart speaker; if Bob receives a message from Alice to call her back, it may go unanswered. This option may needlessly consume call management infrastructure 190 resources each time a call is subsequently attempted and fails. The latter option, of using a non-real-time messaging system such as email or SMS, requires that Alice use different messaging and network resources—assuming that she knows of alternate means to communicate with Bob—and requires that Alice await a response from Bob in order to schedule a mutually agreeable time for a call. Both options thus consume messaging network resources and may be inconvenient if Alice's need or inclination to speak with Bob is immediate, but the necessity or interest in speaking with him declines over time.

Accordingly, the system and methods presented here provide for the opportunistic initiation of a real-time communication session between smart speakers, without the need for alternate or intervening messages between users to arrange a time for the call or to schedule a calendar event. The initiation is "opportunistic" because the initiation of a call occurs on an ad hoc basis an earliest available time, or shortly after an earliest available time, that all users intended to be party to the call are determined to be available for the call, without the need for the users to coordinate in advance. Generally, a server system receives an instruction from a first smart speaker device associated with a first user to establish a real-time communication session with a second smart speaker device. In response to the instruction to establish the real-time communication session, the availability of the first user at the first smart speaker device and the availability of a second user at the second smart speaker device is monitored. When it is determined that the first user is available at the first smart speaker device and the second user is available at the second smart speaker device, a real-time communication session is initiated between the first smart speaker device and the second smart speaker device.

In the embodiments described below, the opportunistic initiation is carried out by an intelligent automated assistant service 150 in communication with respective smart speaker devices for each user.

Figure 5:
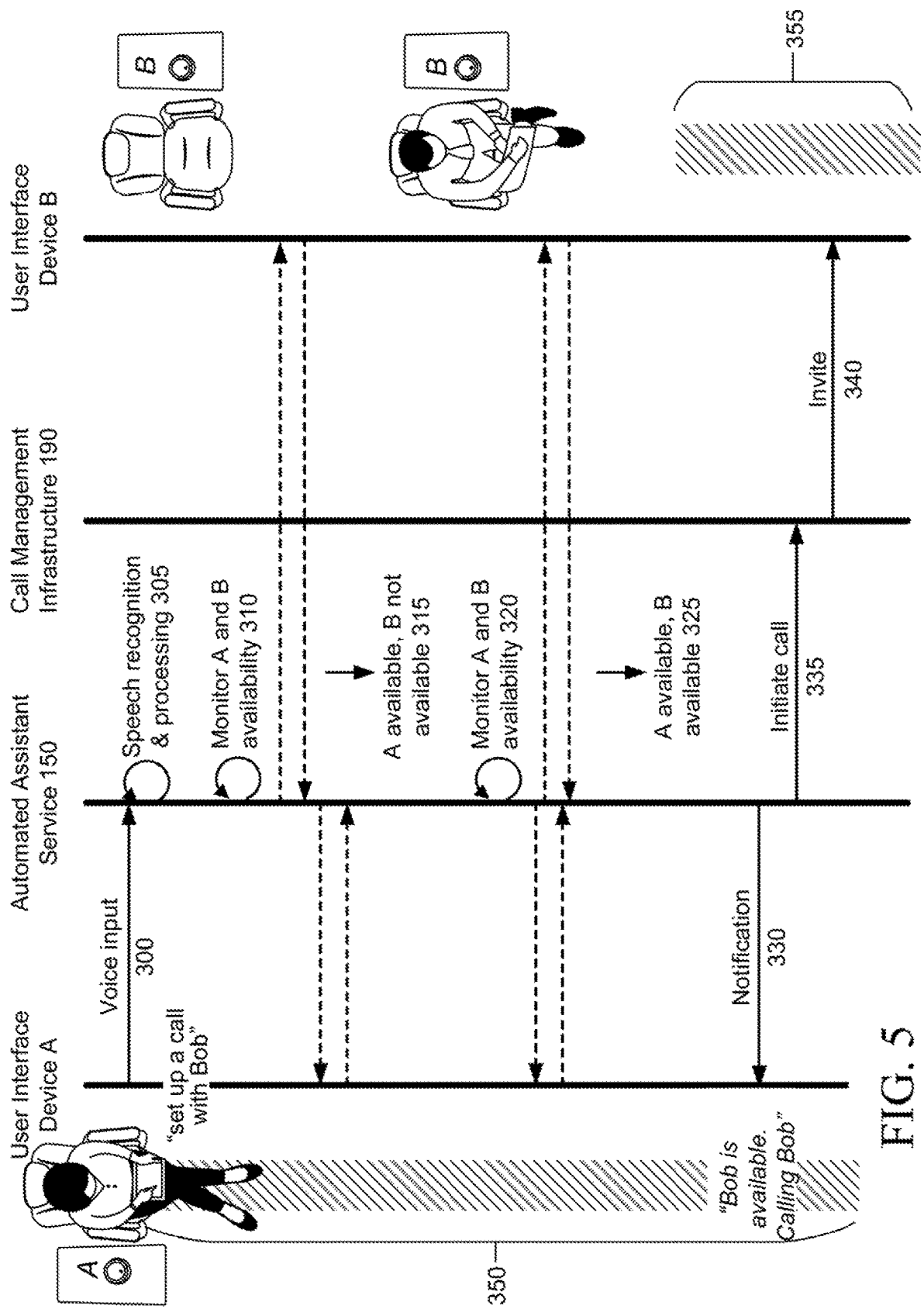
FIG. 5 is an interaction diagram of a process of opportunistically initiating a call between two smart speaker devices.

Turning to FIG. 5, an interaction diagram shows a possible sequence of execution for a first user's smart speaker device (user interface device A), a second user's smart speaker device (user interface device B), an intelligent automated assistant service 150, and call management infrastructure 190. At an initial step, user A at user interface device A wishes to place a call to user B and provides her user interface device A with a spoken instruction, "set up a call with Bob". User A is not required to specify a time or date for the call. User A's speech input is transmitted 300 by the user interface device A to the intelligent automated assistant service 150, where as described above the service 150 processes the received speech data to identify an instruction and process to execute. On recognizing a command for opportunistic initiation of a call, at 310 the intelligent automated assistant service 150 commences monitoring the availability of at least user B, and optionally user A as well at 305, to determine when the user may be available to receive (in the case of user B) or initiate (in the case of A) a call between their respective smart speaker devices. While in this example the availability of both users A and B is monitored, in some implementations the intelligent automated assistant service 150 may be configured to treat user A as available for a predefined period of time after her spoken instruction to set up the call. For example, user A may be assumed to be continuously available for a period of 10 to 30 minutes after her initial instruction to set up the call.

Monitoring availability may comprise retrieval of data from one or more sources, including the user's smart speaker device, to determine availability of the user for a call. Availability of a user may be determined from a variety of data inputs, which may include a current state of the user's respective smart speaker device (e.g., user interface device A or B); recent user activity at their respective smart speaker device; sensor data detected by the respective smart speaker device; or other data obtained from a system other than the smart speaker device.

A current state of the user's respective smart speaker device may include the state of any power or privacy settings (e.g., whether a do-not-disturb or mute mode is enabled); whether the smart speaker device is currently paired with an identified mobile device associated with the user (e.g., whether the user's smartphone is paired with the smart speaker device); whether the smart speaker device detects the presence of a mobile device, even if unpaired, over short-range wireless communication, such as Bluetooth; or whether an identified computing or mobile device associated with the user is connected to the same Wi-Fi network. These conditions may tend to indicate that the user is present with the smart speaker device. Other conditions may tend to indicate that the user may be present, but if so, is not alone. For example, detection of an unknown mobile device or multiple mobile devices available for pairing via Bluetooth may suggest that another person is nearby.

Recent smart speaker device activity can include conditions such as: whether the smart speaker device was in use within a specified period of time, for example within the previous 5 minutes or 2 minutes; whether the wake word or a recognized speech instruction was detected within a specified recent period of time; or whether any speech input was detected at all by the smart speaker within a specified recent period of time. These conditions, of course, indicate that it is likely that the user was at least recently present, if not still present. Other detected activity may indicate that the user is not alone; for example, if the smart speaker device or the intelligent automated assistant service 150 is capable of distinguishing voices, a determination that recently detected speech input is likely attributable to multiple speakers may tend to suggest that if the user is present, he is not alone.

Other sensor data that may be detected by the other sensors 240 of a user's smart speaker device can include environmental data, such as ambient light level. A determination of an elevated light sensor may tend to indicate that the room in which the smart speaker device is located is occupied, while a low level may indicate that the room is vacant.

External data may include calendar event data, which would indicate whether the user is not available (i.e., because a calendar event is scheduled for the current time at which the monitoring 310 occurs) or available (because no event is scheduled). Location information in the calendar event may also be used to assess availability; for example, if a calendar event occurring before or after the time of monitoring 310 indicates an event location other than the location of the user's smart speaker device, the user may be determined to be unavailable for the quarter or half hour preceding and/or following the calendar event to allow for travel time between the event location and the smart speaker location. External data can also include contextual information, such as a current time of day for the user. In a workplace scenario, a user may be available during business hours, but can be deemed to be unavailable outside business hours. In a household, the converse may apply. External data may also include sensor or location data for other devices, such as the user's smartphone as determined by a Global Positioning System (GPS) module or other location technology. As another example, the location of the user's vehicle may be tracked as well. Location of the user's smartphone or vehicle proximate to the smart speaker device may indicate that the user is available. Other types of data may also be used to infer an availability or unavailability of the user.

These various types of data may be used singly or in various combinations to infer a probability that the user is available for a call at his smart speaker device, or is not available. Each condition described above may be assigned a relative probability or weight; for example, the presence of the user's smartphone near the smart speaker may indicate user availability with 80% probability, while a current time of day outside regular business hours may indicate a probability of user availability of 0%. The probabilities or weights of all the monitored data may be combined to determine whether a specified probability threshold is reached. If the threshold is met, then the user is determined to be available. The availability monitored here may be different than mere "presence" of the user; for example, if monitored conditions indicate that the user may be physically present but is not alone or has a currently scheduled calendar event, they may be determined to be unavailable for the purpose of opportunistic call initiation.

The foregoing is only one example of how monitoring 310 may be implemented. Even simpler implementations are possible; for example, availability of a user may be determined from a user's express spoken command to a smart speaker that they are or are not available.

In any event, in the example of FIG. 5, the intelligent automated assistant service 150 collects any appropriate data in order to determine availability of users A and B. In this implementation, monitoring only starts once a user (i.e., user A) has initiated a process of setting up an opportunistic call. In other implementations, availability may be continuously monitored by a intelligent automated assistant service 150, but only utilized for the purpose of setting up an opportunistic call when a request is received from a user. As shown by the dashed lines in FIG. 5, at least some of the data used to determine availability may be obtained from the users' respective smart speaker devices, user interface devices A and B. This data may be obtained by the intelligent automated assistant service 150 by requests to the user's smart speaker device, to which the smart speaker device responds; alternatively, the data may be pushed to the intelligent automated assistant service 150 by the smart speaker device without a prior request by the service 150. The intelligent automated assistant service 150 may obtain other data from other services via application programming interfaces or other appropriate mechanisms.

Initially, in this example, it is determined by the intelligent automated assistant service 150 at 315 that user B is not available, but user A is available. Monitoring of the users' availability repeats at 320. Eventually, both users A and B are determined by the intelligent automated assistant service 150 to be available at 325. On this determination, a call can be initiated between A and B and their respective smart speaker devices with an improved probability that both users are available for the call. Thus, at 330, the user interface device A may issue an audible and/or visual notification to user A that user B is available, and that a call is being initiated. Optionally, user A may be given the opportunity to cancel the call before it is initiated or before both users A and B are determined to be available, if user A has changed her mind. This may be done, for example, by user A issuing a new spoken command to the user interface device A to cancel the call (e.g., "cancel the call with Bob", or "never mind that call with Bob"). Further, rather than simply notifying user A that the call is being placed, the user interface device A may instead solicit confirmation from the user A that the call should be placed (e.g., "Bob is available. Would you still like to speak to him?"). If the call is to be placed, at 335 the intelligent automated assistant service 150 transmits an instruction to the call management service 190 to initiate the call. Initiation of the call then follows an established protocol; for example, a SIP invite message may be transmitted to user interface device B at 340. Alternatively, when it is determined that the call should be initiated, the instruction to initiate the call 335 originates from user interface device A, rather than the intelligent automated assistant service 150. The intelligent automated assistant service 150 simply monitors availability of the parties and notifies user A's smart speaker that the call can now be initiated, and a call session will likely be established since both parties are likely available.

In this example, user B's availability status is only revealed to user A at the time the call finally initiated and established; thus, implicitly user A is made aware of B's absence between the time she initially instructed her smart speaker to set up a call, and the time the call was finally established. This may raise privacy concerns for the users. In some implementations, such as in an enterprise setting, privacy concerns may be minimal since the smart speaker devices are installed in a workplace with a lower expectation of privacy. Regardless, however, the opportunistic call initiation feature may be made available only when user B has explicitly or implicitly authorized user A to have a specified level of access to user B's availability information. In a simple example, if the intelligent automated assistant service 150 can determine that user A is in an address book or contact list associated with user B's, then user A may be implicitly authorized to have access to this availability information. In other implementations, user A must be in user B's contact list, and not blocked; in still other implementations, user B must explicitly add user A to a whitelist of contacts who are authorized to access availability information.

In some implementations, monitoring for availability for an opportunistic call expires after a specified period of time to reduce the likelihood that a call will be initiated at a time when user A has ceased to be interested in speaking to user B. For example, when user A initiates the process by asking for a call to be set up at 300, the intelligent automated assistant service 150 or the user interface device A may set an expiration time for the call, as indicated by shaded box 350. This expiration time sets a time limit for monitoring availability of users A and B, and for initiating the call at 335. If the time 350 expires before both users A and B are determined to be available or before the call is initiated at 335, then monitoring ceases and no call is initiated in response to user A's initial instruction at 300. The expiration time may be at the end of the business day, the end of the next day, or a shorter or longer period of time. In some embodiments, the user A may set the expiration time in her spoken instruction at 300 by specifying a time by which the call must be completed. This time may be specified explicitly (e.g., "I need to speak to Bob in the next half hour"), which expressly defines an expiration time, or implicitly using a modifier indicating a level of priority (e.g., "I need to urgently speak to Bob"), which, according to defined settings in the intelligent automated assistant service 150 or the user interface device A, could be correlated to a defined period of time. Thus, for example, use of a term or phrase identified by the intelligent automated assistant service 150 or the user interface device A to indicate a higher priority, such as "urgently", "soon", "ASAP", or "high priority" would cause the expiration time to be set for a relatively small value (e.g., 15 minutes, half an hour, or an hour); use of a term or phrase identified as indicating a lower priority (e.g., "sometime this week", "I don't care when", "by Friday") may result in a longer expiration time; and lack of any modifier indicating a level of priority would result in a default expiration time.

Once both users A and B have been determined to be available for a call at 325 and before any expiration time 350 that may be set, the intelligent automated assistant service 150 may terminate monitoring for availability in order to conserve resources. Therefore, to minimize the likelihood that the availability status of one or both of the parties may change, the call must be initiated within a specified period of time after the last determination that both users A and B were available. This is indicated by shaded box 355, which indicates a maximum period of time after the determination 325 during which a call must be initiated.

Figure 6:
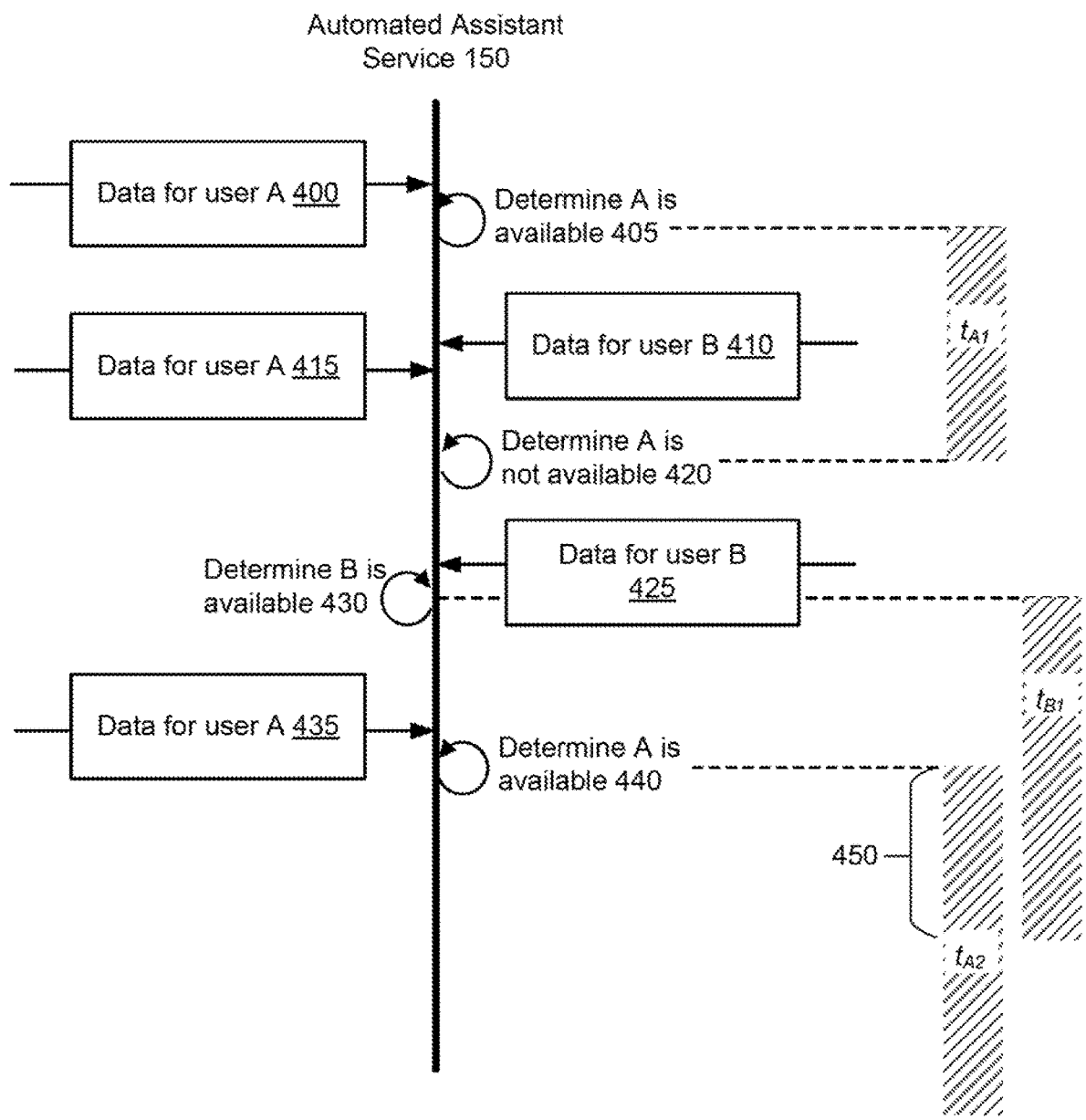
FIG. 6 is a timing diagram of a process for determining availability of two users.

FIG. 6 is a timeline illustrating how monitoring may occur, and when both users A and B are available for a call, which is when the call may be initiated at 335. Initially, as in the example of FIG. 5, user B has already been determined to be unavailable. After that determination, data from the users' respective smart speakers or other data sources is sequentially received at 400, 410, 415, 425, and 435. In this example, the intelligent automated assistant service 150 intermittently updates the availability status of either user A or B as data is received at 405, 420, 430, and 440. In this example, initially at 405, user A is determined to be available for a call; thus, user A is determined to be available for a time period $t_{A1}$ beginning with that first determination at 405. As a result of further data received in respect of user A at 415, the intelligent automated assistant service 150 determines that user A is no longer available at 420. Thus, the time period $t_{A1}$ ends and neither user A nor B is available. After new data is received for user B at 425, user B's availability is updated to be available at 430 for a time period $t_{B1}$ starting with the time of the determination at 425. In the meantime, user A is still not available; but when new data is received at 435, the intelligent automated assistant service 150 updates user A's status as available at 440 for a time period $t_{A2}$ starting at the time of determination 440. Since this new time period $t_{A2}$ starts while user B is available during $t_{B1}$, there is overlap of their availability during the period 450. Accordingly, the intelligent automated assistant service 150 would initiate a call between users A and B during the overlap period 450, preferably shortly after determining that users A and B are concurrently available when the status of user A was updated at 440.

Figure 7:
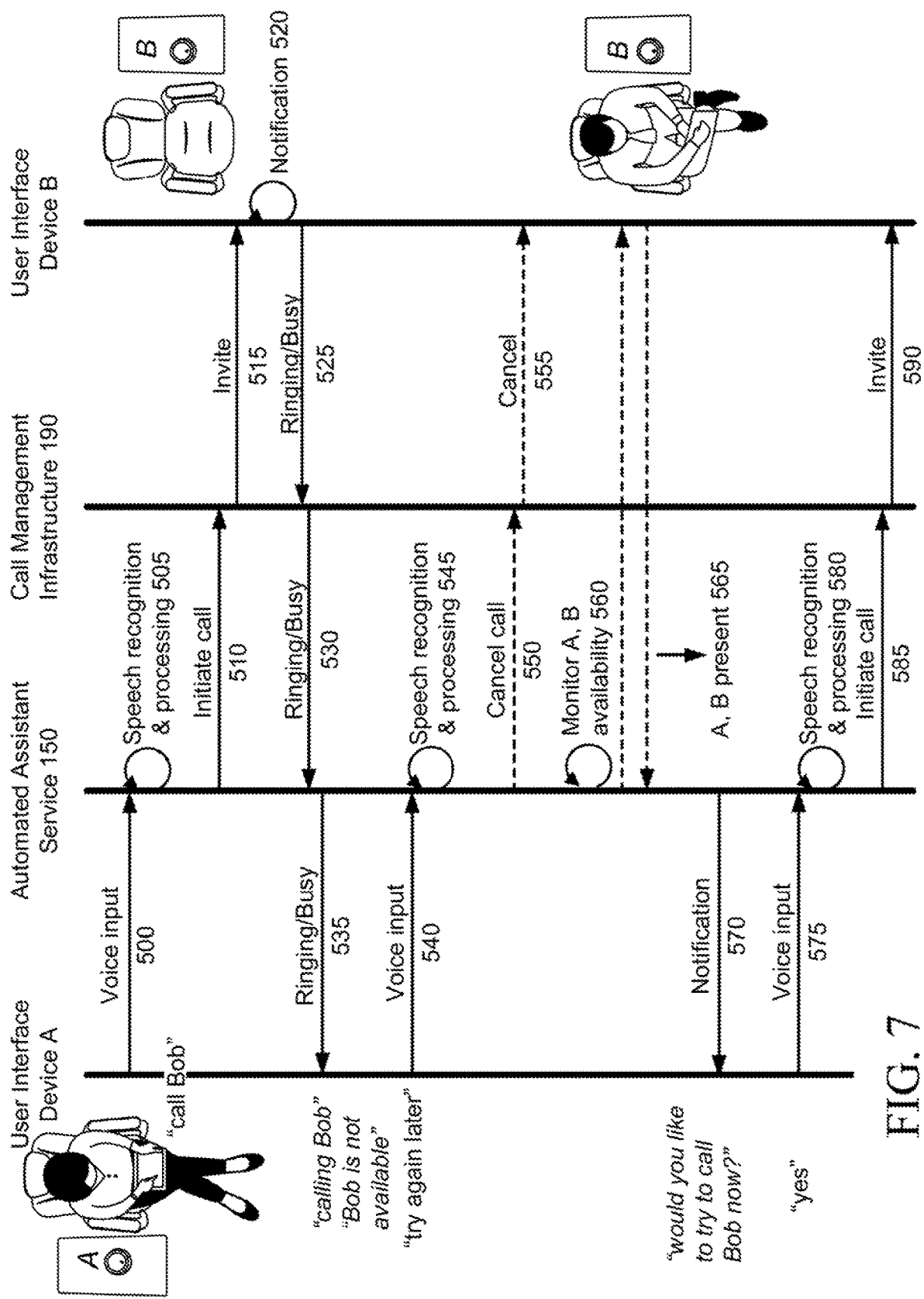

In the example of FIG. 6, the opportunistic call was the only call attempt between user A and user B. FIG. 7 illustrates another implementation in which an opportunistic call is initiated after an initial failed attempt to establish a call session between user A and user B. In this example, at 500 user A initiates the process by attempting to call user B; in this case she simply instructs her smart speaker to "call Bob", and her smart speaker device (user interface device A) sends her voice input for recognition and processing by the intelligent automated assistant service 150 at 505. In response to the recognized command, the intelligent automated assistant service 150 sends an initiate call instruction 510 to the call management infrastructure 190. As noted above, the instruction to initiate the call may instead be sent by user interface device A rather than by the intelligent automated assistant service 150. However, the intelligent automated assistant service 150 monitors the state of the user interface device A and will detect whether or not the user interface device A is engaged in a call. An invitation message (e.g., a SIP invite message) is sent to the user interface device B at 515, which issues a notification to the user B at 520; however, conditions at the user interface device B are such that the call is not successful. The status of the user interface device B may be transmitted to the call management infrastructure 190, the intelligent automated assistant service 150, and/or the user interface A (messages 525, 530, 535). If user B does not answer the call, or if user B is busy, user A may instruct her smart speaker device to "try again later" or otherwise indicate that she is interested in pursuing a call with user B. As before, her voice input 540 is sent to the intelligent automated assistant service 150 for processing at 545; messages to cancel the initial call are transmitted to the call management infrastructure 190 and user interface device B as necessary (messages 550, 555).

The intelligent automated assistant service 150, having received an instruction to attempt the call again later, at 560 initiates monitoring of availability of at least user B, and preferably user A as well, as described above. Eventually, at some time after monitoring is commenced, both A and B are determined to be present at 565. The process then continues substantially as described above in FIG. 6. User A is notified via user interface device A that user B is available or receives from user interface device A a query to confirm that she wishes to speak to user B ("would you like to try to call Bob now?"), at 570. In response to her affirmative voice input 575 ("yes") that is processed 180 by the intelligent automated assistant service 150, a call is initiated, and a call invitation is sent as indicated by 585 and 590. If user A responds in the negative, then no call is initiated.

Again, as noted above, the intelligent automated assistant service 150 may only be employed to monitor availability of the users, and to notify user A when a call may be placed. The call may be initiated directly from user interface device A. It should be understood that the accompanying interaction diagrams omit a number of messages, such as confirmation (ACK, OK) messages that may be transmitted between various nodes as part of the SIP protocol or other call management protocol.

In the foregoing examples, the intelligent automated assistant service 150 carries out monitoring of the availability of the users. In other implementations, this task may be handled by each user's respective smart speaker device, as in the example of FIG. 8. This example begins in a manner similar to FIG. 7, where user A attempts a first call to user B, which is not completed (not shown in FIG. 8), and an initial call invitation is sent to user interface device B at 515. Note, however, that this example may also begin in a manner similar to that illustrated in FIG. 5, in which user A instructs her smart speaker device to set up a call at an unspecified time; in that case an invitation 515 is not sent to user interface device B, but instead a notification is sent from the intelligent automated assistant service 150 to the user interface device B that a call is sought at a next available time.

In response to this invitation or notification, an audible or visual notification 520 may issue at the user interface device B to the user, in case he is present and available to answer the call; but if he is not available, at 600 the user interface device B determines whether or not user A is authorized to receive availability information. This determination may be made as described above. In the event that the user interface device B does not store the required information (e.g., the contact list or whitelist), this information may have to be requested and received from the intelligent automated assistant service 150.

If the user A is authorized, then at 605 the user interface device B sets a flag or other indicator to monitor availability of user B and to notify the intelligent automated assistant service 150 when user B is available for a call. As described in the context of the example of FIG. 5, an expiration time may be set for monitoring, but now the expiration time is set at the user interface device B. Monitoring may include monitoring of the same type of data described above to assess availability. If data not available at the user interface device B is required, then the user interface device B may need to request any necessary data from the intelligent automated assistant service 150, as indicated at 615. On determining that user B is available, the user interface device B sends a notification to the intelligent automated assistant service 150 at 620 that user B is now available; this may terminate the monitoring at user interface device B, so the flat or other indicator set at 605 is cancelled or deleted.

A notification 625 is then sent from the intelligent automated assistant service 150 to user interface device A. User interface device A may then proceed as described above, requesting confirmation from user A that the call should proceed; receiving voice input 630 confirming the call should proceed; the intelligent automated assistant service 150 processing the speech input and initiating the call 635, 640; and an invitation 645 being sent to the user interface device B. Again, as described above, the invitation for the call 645 may be sent from the user interface device A.

In this implementation, intelligent automated assistant service 150 may monitor availability of the user A as described above, to determine when the notification 625 should be sent. Alternatively, no monitoring of the availability of user A may occur. If the notification 625 does not receive a response from user A, then no call is initiated.

While the foregoing examples were described with only two participants in a call, user A and user B, it will be understood by those skilled in the art that these examples can be extended to a larger number of users participating in a multi-party call. The intelligent automated assistant service 150 would then monitor the availability of each user, or each user's individual smart speaker device would carry out the monitoring. Furthermore, while these examples were described in the context of a smart speaker, it will be understood by those skilled in the art that other types of user interface devices for accessing an intelligent automated assistant service may be employed, such as mobile communication devices, personal computers, tablet computers, smart TVs, and other devices.

The examples and embodiments are presented only by way of example and are not meant to limit the scope of the subject matter described herein. Variations of these examples and embodiments will be apparent to those in the art and are considered to be within the scope of the subject matter described herein. For example, some steps or acts in a process or method may be reordered or omitted, and features and aspects described in respect of one embodiment may be incorporated into other described embodiments.

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer hard drive, etc.) that contain instructions for use in execution by one or more processors to perform the operations described herein. The media on which the code may be provided is generally considered to be non-transitory or physical.

Code executable to configure the user interface devices to perform the methods described above may be downloaded to the memory of a user interface device over a network, such as the Internet. This code may be distributed in the form of purchasable skill packages or programmatic enhancements from an online marketplace, and deliverable directly to user interface devices from the online marketplace.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object, applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

Use of any particular term should not be construed as limiting the scope or requiring experimentation to implement the claimed subject matter or embodiments described herein. Any suggestion of substitutability of the data processing systems or environments for other implementation means should not be construed as an admission that the invention(s) described herein are abstract, or that the data processing systems or their components are non-essential to the invention(s) described herein.

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent Office records, but otherwise reserves all rights whatsoever.

The invention claimed is:

1. A system for opportunistic initiation of communication, the system comprising:
    a first smart speaker device associated with a first user, wherein the first smart speaker device comprises at least a microprocessor, a communications subsystem, an audio input subsystem, and an audio output subsystem, the first smart speaker device configured to receive speech input comprising an instruction to set up a real-time communication session on behalf of the first user and to transmit the speech input over a network using the communications subsystem;
    a second smart speaker device associated with a second user;
    a server system remote from both the first smart speaker device and the second smart speaker device, the server system comprising at least one processor and at least one communications subsystem, the server system being configured to:
        receive, via the at least one communications subsystem, the speech input comprising the instruction,
        responsive to the speech input from the first user comprising the instruction:
            determine that the second user is currently unavailable for real-time communication,
            monitor availability of the first user at the first smart speaker device and the second user at the second smart speaker device for a period of time after receiving the instruction,
            determine, while monitoring, that the first user has ceased to be available for real-time communication,
            subsequently determining, while monitoring, that the second user has become available for the real-time communication,
            subsequently determining, while monitoring, that the first user has also become available for the real-time communication, and,
            when the server system determines that the first user is available at the first smart speaker device and the second user is available at the second smart speaker device, to cause the system to initiate on behalf of the first user a real-time communication session between the first smart speaker device and the second smart speaker device.

2. The system of claim 1, wherein the server system is configured to determine availability of each of the first and second user based on at least one factor comprising at least one of:
    a state of the second smart speaker device;
    recent activity detected by the second smart speaker device;
    sensor data detected by the second smart speaker device; and
    contextual data stored remotely from the second smart speaker device.

3. The system of claim 2, wherein the at least one factor used to monitor availability of the first user is different from the at least one factor used to monitor availability of the second user.

4. The system of claim 1, wherein the server system is configured to determine that the first user is authorized by the second user prior to monitoring availability of the second user.

5. The system of claim 1, wherein the server system is configured to, prior to initiating the real-time communication session, obtain confirmation from the first user using the first smart speaker device that the real-time communication session is to be initiated.

6. The system of claim 1, wherein initiating the real-time communication session comprises initiating a session using Session Initiation Protocol.

7. The system of claim 1, wherein the first smart speaker device is configured to initiate the real-time communication session by transmitting a call invitation to the second smart speaker.

8. The system of claim 1, wherein the server system is configured to initiate the real-time communication session by transmitting an instruction to initiate the session to a call management infrastructure.

9. The system of claim 1, wherein the server system executes an intelligent automated assistant service.

10. The system of claim 1, wherein the server system is configured to determine that the first user is available at the first smart speaker device and the second user is available at the second smart speaker device when the server system determines that the first user is available for the real-time communication within a pre-defined period of time after determining that the second user is available for the real-time communication.

11. A method of opportunistically initiating user-to-user communication via smart speaker devices, comprising:
 a server system receiving an instruction from a first smart speaker device associated with a first user to establish a real-time communication session on behalf of the first user with a second smart speaker device;
 responsive to the instruction,
  the server system determining that a second user associated with the second smart speaker device is currently unavailable for real-time communication,
  monitoring availability of the first user at the first smart speaker device and monitoring availability of a second user at the second smart speaker device;
  determining, while monitoring, that the first user has ceased to be available for real-time communication;
  subsequently determining, while monitoring, that the second user has become available for the real-time communication;
  subsequently determining, while monitoring, that the first user has also become available for the real-time communication; and
  when it is determined that the first user is available at the first smart speaker device and the second user is available at the second smart speaker device, initiating on behalf of the first user the real-time communication session between the first smart speaker device and the second smart speaker device.

12. The method of claim 11, wherein monitoring availability comprises the server system determining availability of each of the first and second user based on at least one factor comprising at least one of:
 a state of the second smart speaker device;
 recent activity detected by the second smart speaker device;
 sensor data detected by the second smart speaker device; and
 contextual data stored remotely from the second smart speaker device.

13. The method of claim 12, wherein the at least one factor used to monitor availability of the first user is different from the at least one factor used to monitor availability of the second user.

14. The method of claim 11, further comprising, prior to initiating the real-time communication session, obtaining confirmation from the first user using the first smart speaker device that the real-time communication session is to be initiated.

15. The method of claim 11, wherein initiating the real-time communication session comprises initiating a session using Session Initiation Protocol.

16. The method of claim 11, wherein initiating the real-time communication session comprises first smart speaker device transmitting a call invitation to the second smart speaker.

17. The method of claim 11, wherein initiating the real-time communication session comprises the server system transmitting an instruction to initiate the session to a call management infrastructure.

18. The method of claim 11, wherein the determination that the first user is available at the first smart speaker device and the second user is available at the second smart speaker device occurs when a determination that the first user is available for the real-time communication is made within a pre-defined period of time after a determination that the second user is available for the real-time communication is made.

\* \* \* \* \*